United States Patent
Park et al.

(10) Patent No.: US 9,749,110 B2
(45) Date of Patent: Aug. 29, 2017

(54) MAC PROTOCOL FOR WIDE-BANDWIDTH TRANSMISSION UTILIZING ECHO CANCELLATION FOR WI-FI

(71) Applicant: INTEL CORPORATION, Santa Clara, CA (US)

(72) Inventors: Minyoung Park, Portland, OR (US); Shahrnaz Azizi, Cupertino, CA (US); Alexander W. Min, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/860,977

(22) Filed: Sep. 22, 2015

(65) Prior Publication Data
US 2017/0086193 A1  Mar. 23, 2017

(51) Int. Cl.
*H04W 28/20* (2009.01)
*H04W 72/12* (2009.01)
*H04L 5/00* (2006.01)
*H04W 74/08* (2009.01)

(52) U.S. Cl.
CPC ....... *H04L 5/0055* (2013.01); *H04W 74/0808* (2013.01)

(58) Field of Classification Search
CPC . H04W 72/04; H04W 24/00; H04W 74/0808; H04L 27/0006; H04L 5/00; H04L 84/12
USPC .......................................... 370/241, 329, 33
See application file for complete search history.

(56) References Cited

U.S. PATENT DOCUMENTS

| | | | |
|---|---|---|---|
| 2008/0096542 A1* | 4/2008 | Chu | H04W 48/12 455/422.1 |
| 2011/0194542 A1* | 8/2011 | Kim | H04W 72/0453 370/338 |
| 2011/0292919 A1* | 12/2011 | Trainin | H04L 5/0048 370/338 |
| 2014/0064101 A1* | 3/2014 | Hart | H04W 74/0808 370/241 |

OTHER PUBLICATIONS

U.S. Appl. No. 14/748,897, filed Jun. 24, 2015, Park et al.

* cited by examiner

*Primary Examiner* — Melvin Marcelo
*Assistant Examiner* — Natali N Pascual Peguero
(74) *Attorney, Agent, or Firm* — Jason H. Vick; Sheridan Ross, PC

(57) ABSTRACT

Techniques for presenting communication by two or more stations in a WLAN environment are provided. Specifically, methods are presented, that when taken alone or together, provide a device or group of devices with an efficient way for bandwidth adaptation using echo cancellation. Even more specifically, a narrow-bandwidth transmission can be interrupted in favor of a higher-bandwidth transmission upon one or more secondary channels becoming available or going quiet.

25 Claims, 11 Drawing Sheets

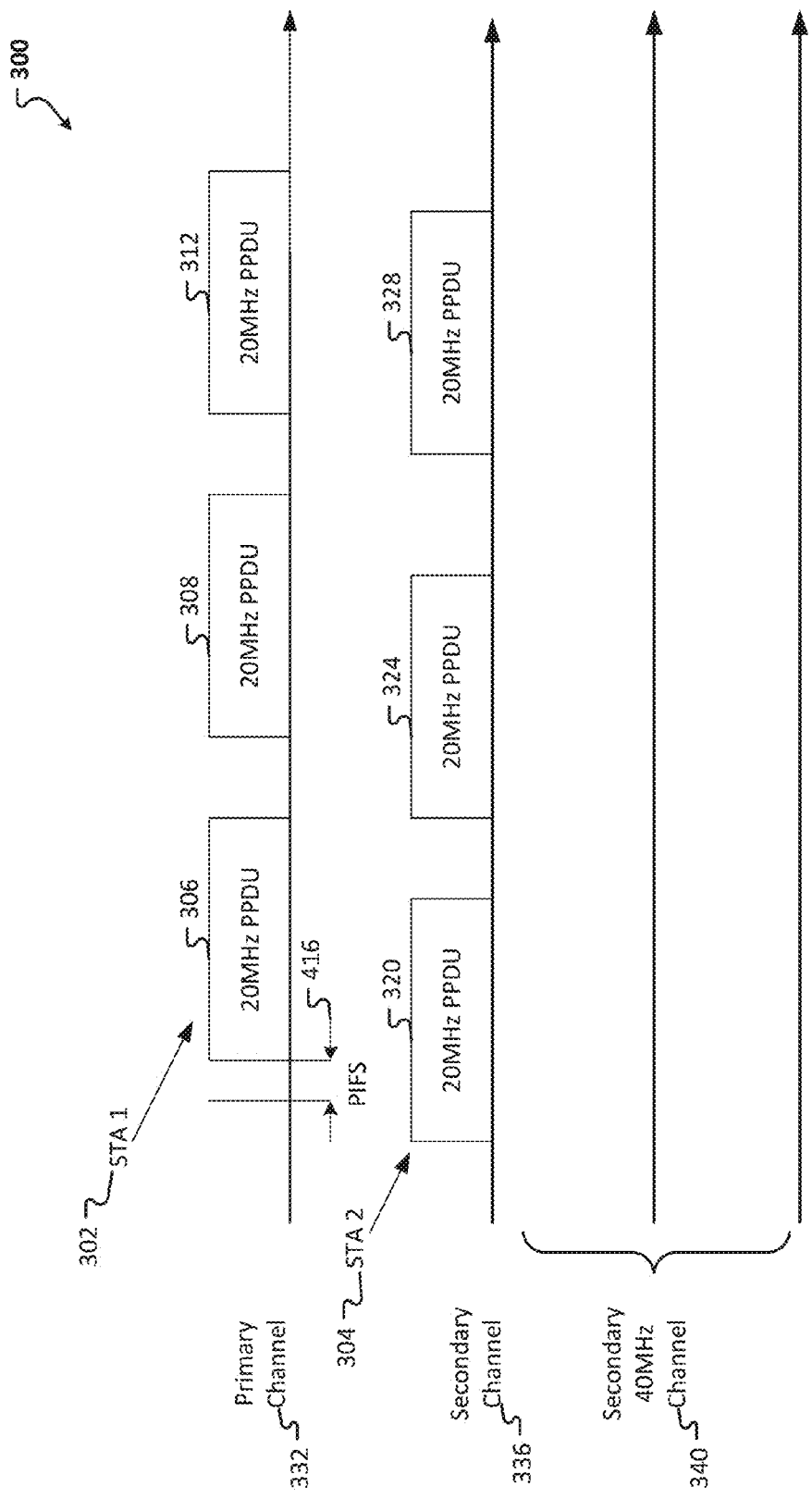

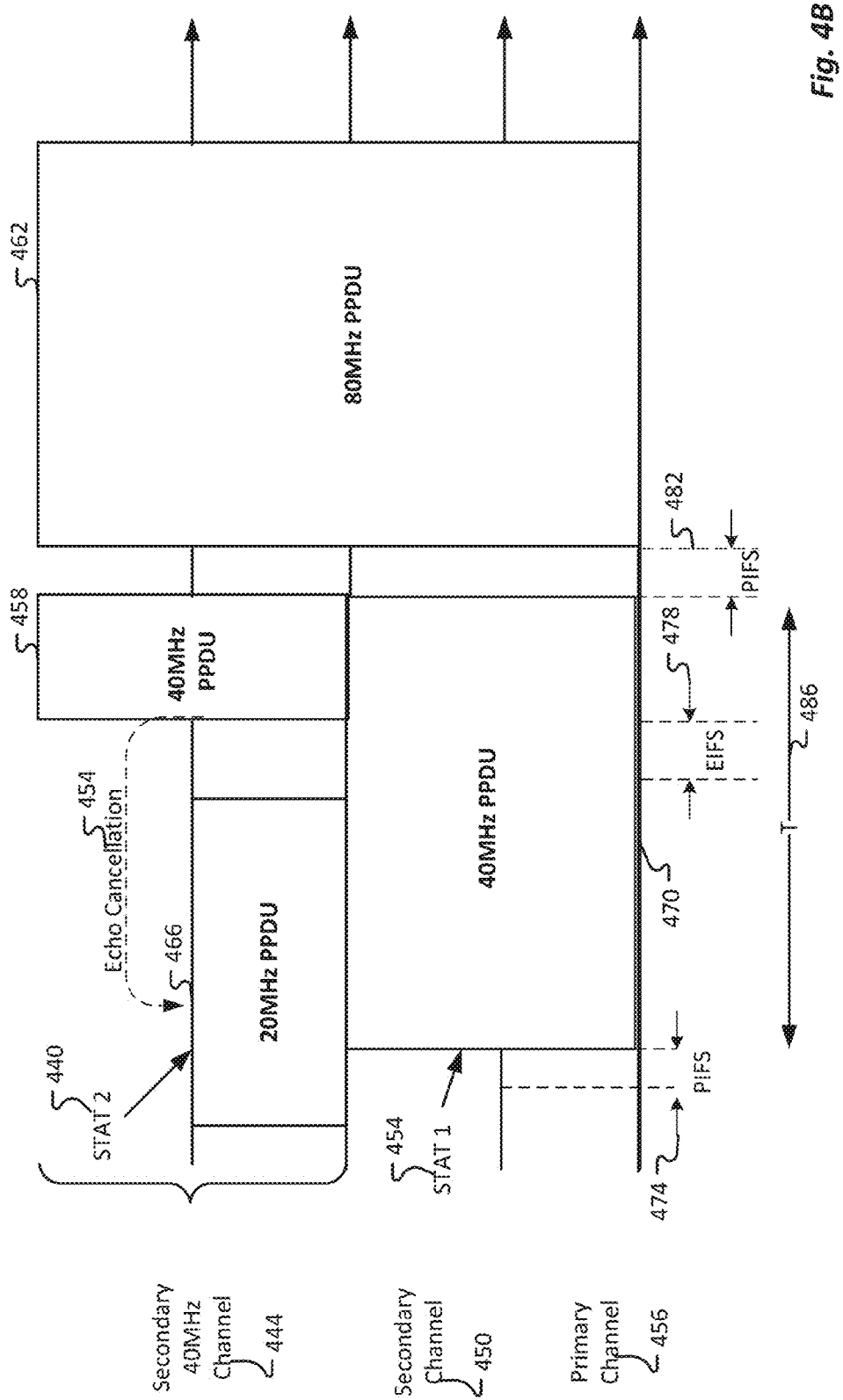

MAC PROTOCOL FOR WIDE-BANDWIDTH TRANSMISSION UTILIZING ECHO CANCELLATION FOR WI-FI

TECHNICAL FIELD

An exemplary embodiment is directed toward wireless networks. Some embodiments relate to wireless networks that operate in accordance with one of the Institute of Electrical and Electronics Engineers (IEEE) 802.11 standards including the IEEE 802.11-2012 standards. Some embodiments relate to a wireless network communicating using Wireless Local Area Networks (WLAN). Exemplary embodiments also relate to the communication of two or more stations using echo cancellation for wide-bandwidth transmission.

BACKGROUND

The IEEE 802.11 standards for WLAN communication has long been known to operate at various frequencies including the 5 GHz spectrum. At this spectrum and over the years the concept of Orthogonal Frequency Division Multiplexing (OFDM), Multi-Input Multi-Output (MIMO) communications, and use of wider channel bandwidths have been introduced. The concept of wider channel bandwidths has evolved from transmission over a 20 MHz bandwidth on legacy products to a recently added 80 MHz and 160 MHz bandwidth transmission schemes. The increase of bandwidth was inspired by the possibility of an increase in throughput.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3A illustrates an exemplary narrowband Physical Layer Convergence Protocol (PLCP) Protocol Data Unit (PPDU) transmission;
FIG. 4B illustrates a second exemplary wide bandwidth PPDU transmission with echo cancellation.

DESCRIPTION OF EMBODIMENTS

Figure 1:
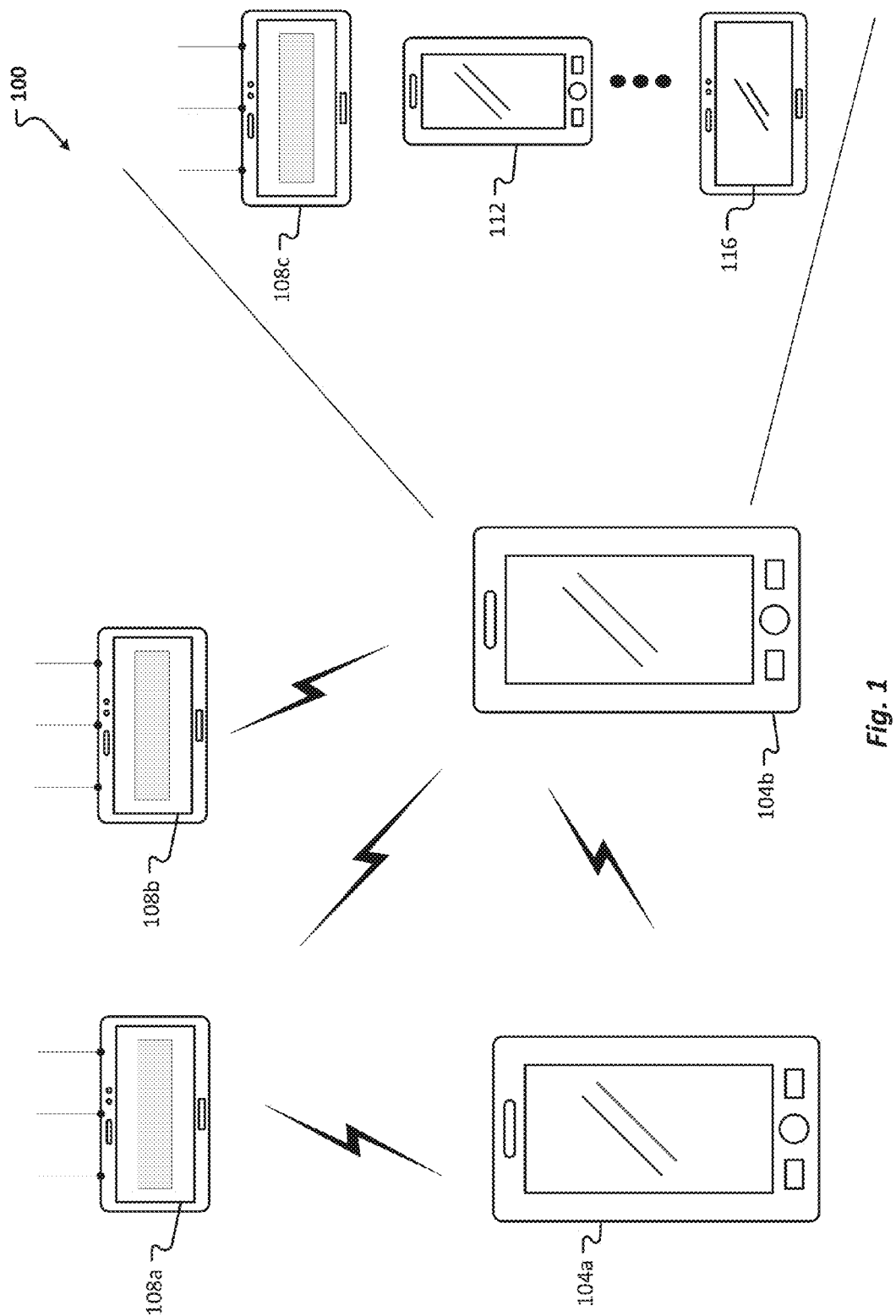
FIG. 1 illustrates an exemplary communication system.

However, the availability of a wider bandwidth does not always prove productive. In general, a station (STA) in the process of transmitting on a wider bandwidth needs to identify one or more secondary channels which are idle and available for transmission. If one or more secondary channels are busy, then the station is limited to a transmission on only those channels that are available. Therefore, if the secondary channel(s) is busy, a station can end up using only the primary 20 MHz channel. If this occurs on a regular basis, then the device performance degrades to performance similar to that of a legacy 20 MHz IEEE 802.11a device, while wasting available spectrum resources on the secondary 20 MHz and 40 MHz channels.

The problem persists because stations on the primary and the secondary channels are not synchronized. Therefore, the station on the primary channel may not be aware of the channel status of the secondary channels except during the time interval just before packet transmission. Preliminary results have found that a station with this limited awareness of secondary channels provides for transmitting an 80 MHz Physical Layer Convergence Protocol (PLCP) Protocol Data Unit (PPDU) only about 20% of the time while 20 MHz PPDUs are transmitted 80% of the time.

Although IEEE 802.11 standards support 80 MHz and optionally 160 MHz PPDU transmissions, it is difficult to transmit wide bandwidth PPDUs when the secondary channels are busy due to other base stations' activities. The difficulty arises from the transmitting station's limited access to secondary channel status, thus limiting the throughput performance to that of legacy IEEE 802.11 systems. The availability of a wider bandwidth goes underutilized and the overall system performance degrades. Therefore, it is with these and other considerations that the present improvements and enhancements have been developed.

The IEEE 802.11 standard specifies a common Medium Access Control (MAC) Layer which provides a variety of functions that support the operation of IEEE 802.11-based wireless LANs (WLANs). The MAC Layer manages and maintains communications between IEEE 802.11 stations (such as between radio network interface cards (NIC) in a PC or other wireless devices or stations (STA) and access points (APs)) by coordinating access to a shared radio channel and utilizing protocols that enhance communications over a wireless medium.

IEEE 802.11n, introduced in 2009, improved the maximum single-channel data rate from 54 Mbps of IEEE 802.11g to over 100 Mbps. IEEE 802.11n also introduced MIMO (multiple input/multiple output), where, according to the standard, up to 4 separate physical transmit and receive antennas carry independent data that is aggregated in a modulation/demodulation process in the transceiver.

The IEEE 802.11ac specification operates in the 5 GHz band and adds channel bandwidths of 80 MHz and 160 MHz with both contiguous and non-contiguous 160 MHz channels for flexible channel assignment. IEEE 802.11ac also adds higher order modulation and supports multiple concurrent downlink transmissions ("multi-user MIMO" (MU-MIMO)), which allows transmission of multiple spatial streams to multiple clients simultaneously. By using smart antenna technology, MU-MIMO enables more efficient spectrum use, higher system capacity and reduced latency by supporting up to four simultaneous user transmissions. IEEE 802.11 ac streamlines the existing transmit beamforming mechanisms which significantly improves coverage, reliability and data rate performance.

IEEE 802.11 ax is the successor to IEEE 802.11 ac and is proposed to increase the efficiency of WLAN networks, especially in high density areas like public hotspots and other dense traffic areas. IEEE 802.11ax will also use orthogonal frequency-division multiple access (OFDMA). Related to IEEE 802.11 ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

Embodiments may be implemented as part of Wi-Fi Alliance® Technical Committee Hotspot 2.0 Technical Task Group Hotspot 2.0 (Release 2) Technical Specification, Version 2.04, Jan. 2, 2013. However, the embodiments are not limited to IEEE 802.11 standards or Hotspot 2.0 standards. Embodiments can be used in implementation with other wireless communications standards, protocols, and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, cellular networks, wireless local area networks and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a network operation or management device, a node or collocated on a particular node of a distributed network, such as a communications network. As will be appreciated from the following description, and for reasons of computational efficiency, the components of the system can be arranged at any location within a distributed network without affecting the operation thereof.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

Presented herein are embodiments of systems, processes, methods, etc. The embodiments may relate to a communication device and/or communication system. The communication system can include a Wireless Local Area Network (WLAN) connection. A WLAN connection can include communication and association between two or more stations or wireless devices transmitting wide bandwidth PPDUs. The overall design and functionality of the system described herein is, as one example, a means for continuously monitoring secondary channel status using echo cancellation for opportunistic wide bandwidth transmission.

One embodiment provides novel networking mechanisms that enable bandwidth adaptation by leveraging the use of echo cancellation by the transmitting station. The technique can generally increase throughput by adapting the bandwidth used for transmission midstream as a secondary channels become available. As a result, access to wider bandwidth transmissions are increased by up to 50% and a higher system throughput is achieved as the signal transmission is adjusted. Other advantages and improvements and enhancements exist as well as will be discussed herein.

Another exemplary embodiment leverages and enhances this utilization of echo cancellation for adjacent channel sensing to enhance wide-bandwidth transmission. The exemplary method utilizes an echo cancellation technique at a transmitter to sense the secondary channels during a packet transmission. This enables the transmitter to detect when the secondary channel(s) becomes idle and enables the transmitter to transmit a wide bandwidth PPDU when the secondary channels become idle.

One addition to this concept is the ability to define a MAC protocol that can exchange necessary information between the transmitter and the receiver for a wider-bandwidth transmission in, for example, the middle of the narrow-bandwidth transmission (e.g., 20 MHz→80 MHz). For example, the receiver that was initially receiving a 20 MHz PPDU has to know if the receiver will be receiving a wider channel bandwidth PPDU (e.g., 80 MHz PPDU) in the middle (or some other portion) of the 20 MHz PPDU reception. The transmitter also needs to know if the receiver is ready to receive a wider channel bandwidth PPDU. The receiver may need to readjust its AGC (Automatic Gain Control) for a wider bandwidth PPDU.

One exemplary embodiment proposes a MAC protocol for the scheme that utilizes echo cancellation to enhance wide-bandwidth transmissions for OFDM based 802.11 stations.

As discussed in greater detail hereinafter, one exemplary principle is to initiate a new duplicate-RTS/CTS exchange (Request to Send/Clear to Send) in a wider channel bandwidth (e.g., 80 MHz) in, for example, the middle of a narrow bandwidth PPDU transmission (e.g., 20 MHz PPDU) when the secondary channel(s) become idle so that NAV information can be set for 3rd party stations on the secondary channels.

In accordance with one exemplary embodiment, the initial data packet transmitted on the narrow channel bandwidth is formatted as an A-MPDU (aggregated MPDU) (MAC Protocol Data Unit) so that the transmission can be interrupted in the middle of the transmission for the duplicate-RTS/CTS exchange without losing the entire packet transmission. For example, the wider-bandwidth channel transition does not affect the reception of A-MPDU subframes transmitted before the duplicate-RTS/CTS exchange. The acknowledgements of the A-MPDU subframes can be delayed until after the wide-bandwidth PPDU transmission.

An exemplary communication environment 100 is illustrated in FIG. 1, which depicts the communication between various devices and stations. The communication environment 100 is a type of environment that can benefit from bandwidth adaptation. The communication environment 100 can contain multiple communication points/station(s) (STA) 104a, 104b. The STAs 104a, 104b can be any one of a laptop computer, smartphone 112, wireless device 116, notebook, an access point, 108c, subnotebook, a tablet or other electronic computing device or communications device, videogame device, entertainment device, Internet of Things (IoT) device, or the like. The communication environment 100 can also include one or more Access Points (APs) 108a, 108b, 108c. The APs 108a, 108b can communicate via a communication channel using uplink and/or downlink transmission with any one or more of STAs 104a, 104b. The communication can be at least one of half-duplex or full-duplex and can occur on primary and/or secondary channels.

In the communication environment 100, STA 104a, can communicate with one or more of APs 108a, 108b. Simultaneously, STA 104b can also communicate with one or more of the APs 108a, 108b during the same time and, for example, on a secondary channel(s). Communication can also occur between the STA 104a and 104b and/or across one or more other wired and/or wireless devices.

Figure 2:
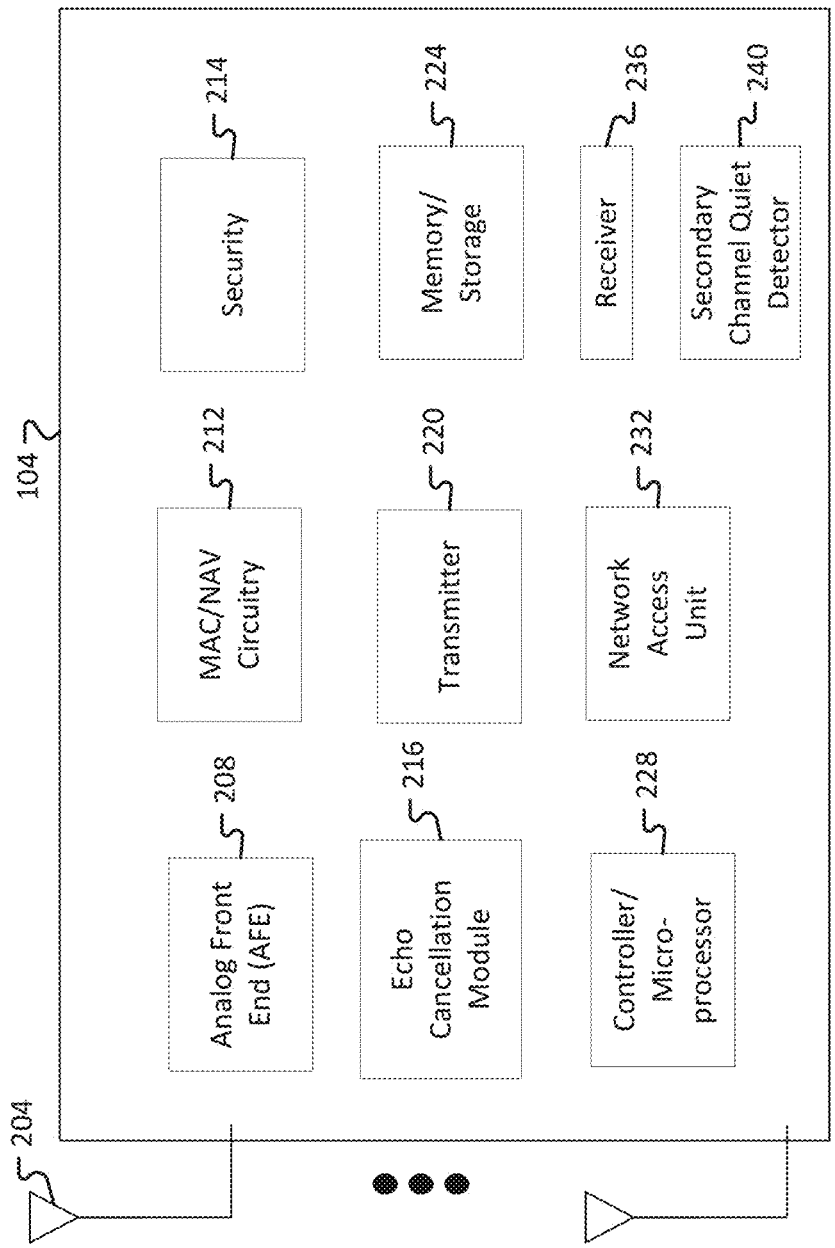
FIG. 2 illustrates an exemplary station (STA)

An example of a station (STA) 104 architecture is shown in FIG. 2. The STA 104 may comprise hardware circuitry and/or software that conduct various operations. The STA 104 also includes conventional and well known components which have been omitted for clarity. The operations can include, but are not limited to, conducting calls, synchronizing with other APs 108, opening multiple applications, presenting information through audio and/or video means, communicating via a WLAN, etc. The STA 104 can be any type of computing system operable to conduct the operations described here. As an example, the STA 104 can be a mobile phone which includes and interacts with various modules and components 208-240 as shown in FIG. 2.

The STA 104 can have one more antennas 204, for use in wireless communications such as multi-input multi-output (MIMO) communications, Bluetooth®, etc. The antennas 204 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 204 generally interact with an Analog Front End (AFE) module 208, which enables the correct processing of the received modulated signal. The AFE 208 is functionally located between the antenna and a digital baseband system in order to convert the analog signal into a digital signal for processing.

The STA 104 can also include a controller/microprocessor 228 and a memory/storage 224. The STA 104 can interact with the memory/storage 224 which may store information and operations necessary for configuring and transmitting or receiving the message frames described herein. The memory/storage 224 may also be used in connection with the execution of application programming or instructions by the controller/microprocessor 228, and for temporary or long term storage of program instructions and/or data. As examples, the memory/storage 224 may comprise a computer-readable device, RAM, ROM, DRAM, SDRAM or other storage devices and media.

The controller/microprocessor 228 may comprise a general purpose programmable processor or controller for executing application programming or instructions related to the STA 104. Further, controller/microprocessor 228 can perform operations for configuring and transmitting message frames as described herein. The controller/microprocessor 228 may include multiple processor cores, and/or implement multiple virtual processors. Optionally, the controller/microprocessor 228 may include multiple physical processors. By way of example, the controller/microprocessor 228 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The STA 104 can further include a transmitter 220 and receiver 236 which can transmit and receive signals, respectively, to and from other STAs 104 or access points 108 using the one or more antennas 204. Included in the STA 104 circuitry is the medium access control or MAC/NAV Circuitry 212. MAC/NAV circuitry 212 provides the medium for controlling access to the wireless medium. In an exemplary embodiment, the MAC/NAV circuitry 212 may be arranged to contend for a wireless medium and configure frames or packets for communicating over the wireless medium.

The MAC/NAV circuitry 212, along with other componentry in the STA 104, is further configured to such that when the secondary and the secondary 40 channels become idle for a fixed duration of time (e.g., PIFS), a station can stop the current A-MPDU transmission and transmits duplicate RTS frames across the available channel bandwidth. For example, STA1 may need a short transition time to switch to a wider-bandwidth transmission. In the example shown hereinafter, STA1 is transmitting four duplicate RTS frames on the 80 MHz channel. The RTS frames may set a new NAV for the wide-bandwidth PPDU transmission on the primary and the secondary channels. The RTS frame on the primary channel may include new information indicating that the current narrow-bandwidth packet transmission has ended in favour of a new wide-bandwidth packet transmission The Echo Cancellation Module 216 can work or independently of the MAC/NAV circuitry 212 and/or the secondary channel quiet detector and can be used in determining the status of secondary channels, e.g., quiet or in use. The STA 104 in conjunction with the Echo Cancellation Module 216 can use known information from its own transmission to subtract out the transmission interference created on secondary channels. By subtracting self-interference on the secondary channels, the STA 104 is able to monitor the status of the secondary channels. The status can include determining when one or more secondary channels are busy with other stations' transmission and/or idle for use. The Echo Cancellation Module 216 can also work with or independently of the Memory/Storage 224 and Controller/Microprocessor 228 in adjusting station transmission to use wider bandwidths as the bandwidths become available. The Echo Cancellation Module 216 can also be used to determine and/or insert the correct amount of packet information into the PPDU as a new transmission is added to the secondary channels during the initial PPDU transmission period. Additionally, the Echo Cancellation Module 216 can work in conjunction with any of the other STA 104 modules 208-236 if a decision is made to terminate the current transmission and re-transmit at a wider bandwidth.

The STA 104 can also contain a security module 214. This security module 214 can contain information regarding, but not limited to, security parameters required to connect the STA 104 to AP 108 or other available networks, and can include WEP or WPA security access keys, network keys, etc. The WEP security access key is a security password used by Wi-Fi networks. Knowledge of this code will enable the STA 104 to exchange information with the access point 108. The information exchange can occur through encoded messages with the WEP access code often being chosen by the network administrator. WPA is an added security standard that is also used in conjunction with network connectivity with stronger encryption than WEP.

Another module that the STA 104 can include is the network access unit 232. The network access unit 232 can be used for connecting with the AP 108. In one exemplary embodiment, connectivity can include synchronization between devices. In another exemplary embodiment, the network access unit 232 can work as a medium which provides support for communication with other stations. In yet another embodiment, the network access unit 232 can work in conjunction with at least the MAC/NAV circuitry 212. The network access unit 232 can also work and interact with one or more of the modules described herein.

The modules described and others known in the art can be used with the STA 104 and can be configured to perform the operations described herein in conjunction with FIG. 1 and FIGS. 3-5.

The STA 104 can oftentimes communicate with other wireless devices such as other stations, access points, etc., through the use of Protocol Data Units (PDU) for frame transmission. A PDU can be a group of one or more frames that are transmitted to a receiver within a network with control information and/or user data. PDUs are relevant to a number of layers within the Open Systems Interconnection (OSI) model. For example, PDUs in the Data Link Layer are frames that aid in allowing upper layers to access the media and control the data placed onto the media. As another example, the PDU can exist in the Network Layer and can be a packet(s) used to accomplish end-to-end transport. Additionally, PDUs can exist in the Physical Layer and are often termed Physical Layer Convergence Protocol (PLCP) Protocol Data Units (PPDUs). The PPDUs are frames that can contain information such as, but not limited to, a header for information about the frame, a preamble for receiver synchronization, and the payload.

As previously indicated, the IEEE 802.11 standards have added transmission protocols which have provided the opportunity for stations to communicate using varying bandwidths. For example, a STA 104, can have a narrowband transmission using 20 MHz. Alternatively, the STA 104 can sense neighbouring channels and increase the station's transmission to a wider bandwidth transmission of 40 MHz, 60 MHz, 80 MHz, 160 MHz, etc. Transmissions at higher bandwidths require that secondary channels be available.

FIG. 3A illustrates an exemplary narrowband PPDU transmission 300. Generally, a station can begin its transmission by contending for a channel and/or frequency band. Once the station "wins" the band, the station can begin transmitting information including, but not limited to, request to send, clear to send, and other such frames. Transmission of the PPDU in current systems generally occur over a primary channel 332. Introduced in some standards protocols, is the ability to transmit on the secondary channel 336 and even the secondary 40 MHz channel 340. Transmission on what becomes a wide-bandwidth (i.e., secondary channel 336 and secondary 40 MHz channel 340) is possible when these channels are idle. In other words, STA 1 302 transmitting the 20 MHz PPDU 306 can extend to secondary channel 336 and secondary 40 MHz channel 340 if the bandwidth is available. Oftentimes, the use of the wide-bandwidth is not possible as a STA 2 304 is simultaneously transmitting on the secondary channel during at least part of the same time interval as STA 1 302. Consequently, STA 1 302 transmitting the 20 MHz PPDU 306 is unable to extend bandwidth transmission, as STA 2 304 is also transmitting a 20 MHz PPDU 320 during a similar time interval.

To check for a channel transmission on a secondary channel(s) 336, 340, STA 1 302 can sense the medium for other station (i.e., STA 2 304) transmissions. Sensing can occur at a time duration prior to the transmission of the 20 MHz PPDU 306 on the primary channel 332. The time duration can be a Point Coordination Function (PCF) Interframe Space (PIFS) 416, which is a short time interval that can exist in MAC and PHY layers between frame transmissions to ensure the receipt of the last symbol of a frame and/or provides time for a device to respond to the frame received. Note that the PIFS 416 interval can be optional, and/or can instead be any one or more of, but are not limited to, a Distributed Coordination Function (DCF) Interframe Space (DIFS), a Short Interframe Space (SIFS), an Extended Interframe Space (EIFS), etc., or can take on any other time duration.

Therefore, if prior to and/or during a STA 1 302 transmission, secondary channels 336, 340 are busy, then STA 1 302 is limited to using only a 20 MHz bandwidth. As an example, in FIG. 3A, if STA 1 302 is transmitting a 20 MHz PPDU 306, 308, or 312 and checks for idle secondary channels 336, during and a time interval prior to, then STA 1 302 will finds the secondary channel 336 is busy and is limited to 20 MHz transmission. This is because each of the STA 1 302 20 MHz PPDUs 306, 308, and/or 312, STA 2 304 is transmitting 20 MHz PPDUs 320, 324, and/or 328. Therefore, STA 1 302 is unable to take advantage of the secondary channels, and STA 1 302 performance can degrade to that of legacy 20 MHz IEEE 802.11a devices. Recall that IEEE 802.11a devices operate simply on a 20 MHz bandwidth and as such, the STA 1 302 is only operating on the primary channel 332. In addition, if STA 1 302 is only transmitting on the primary channel and the secondary channel is in use, the secondary 40 MHz channel 340 can end up unused.

In some instances, the station (i.e., STA 1 302) transmitting on the primary channel can take advantage of the secondary channel(s) 336, 340 if indeed a neighbouring station (i.e., STA 2 304) is not transmitting at the same time or during a shared time interval.

Figure 3B:
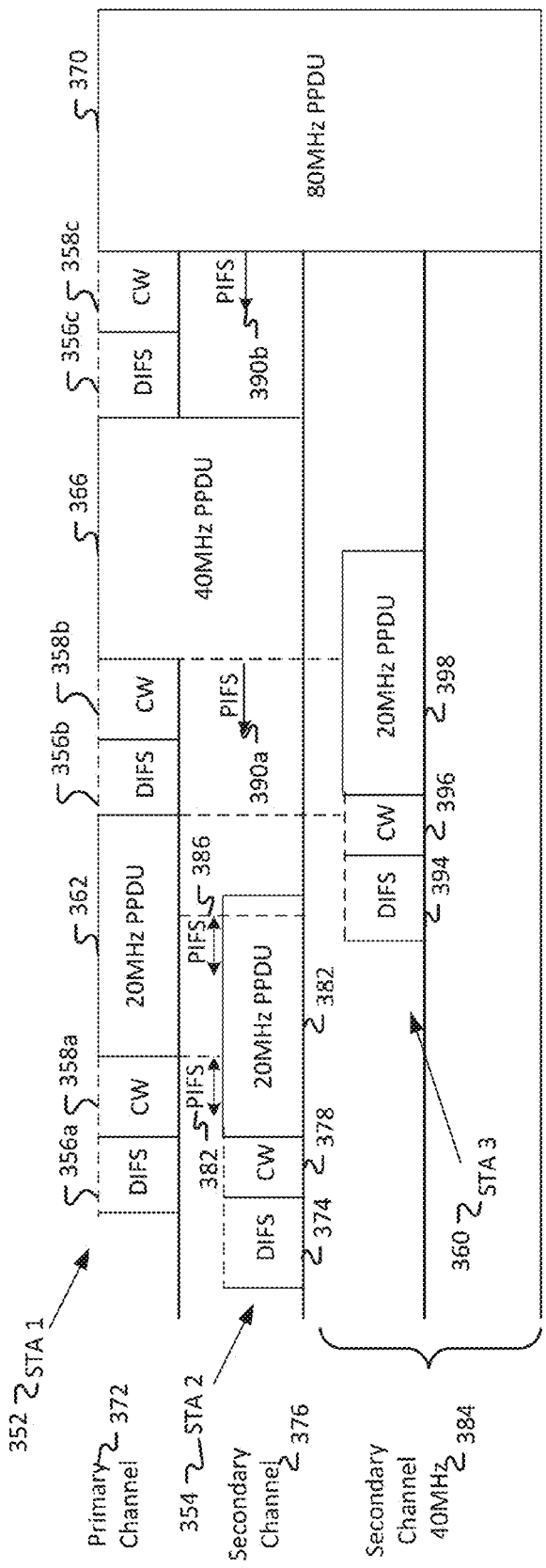
FIG. 3B illustrates an exemplary wide bandwidth PPDU transmission.

FIG. 3B is an exemplary wide bandwidth PPDU transmission. In FIG. 3B, at least three instances of STA 1 352 transmission and the STA 1 352 varying bandwidths are illustrated.

As is the case in network communications (i.e., IEEE 802.11) STA 1 352 begins with channel contention. Channel contention is a mechanism in which a device, such as a STA 1 352, contends with other devices (i.e., STA 2 354) for a channel or a frequency band. The time period during contention is designated a contention window (CW) 358a, 358b, 358c, and generally occurs prior to the transmission of the station's PPDU. Prior to a CW 358a, 358b, and 358c, a time interval DIFS 356a, 356b, 356c can exist between frame transmission. The time interval is optional, can vary, and can include, but is not limited to, PIFS, EIFS, SIFS, etc., and any other time period including no time interval at all.

Once the station has won the medium, the station (i.e., STA 1 352) can begin communicating. As described above, and in conjunction with FIG. 3A, although wide bandwidth transmission is available, often times, the station (STA 1 352) will be limited to a narrowband transmission if the secondary channels 376, 384 are busy. Alternatively, if one or more of the secondary channels 376, 384 are idle then transmission bandwidth can be increased.

For example, if STA 1 352 is transmitting 20 MHz PPDU 362, prior to its transmission, it will sense (i.e., during PIFS 382) for neighbouring stations (STA 2 354) using the secondary channel. In one instance, STA 2 354 is transmitting 20 MHz PPDU 382 and thus, STA 1 352 is limited to a 20 MHz PPDU 362 transmission. As procedurally understood, STA 2 354 began its transmission with a contention window 378 and some interframe space (e.g., DIFS 374) as well.

As STA 1 352 prepares for its next PPDU transmission, STA 1 352 can once again begin contending 358b for the medium and awaiting 356b for the frame transmission. In the next PPDU transmission for STA 1 352, for example, the station (i.e., STA 1 352) was able to determine that secondary channel 376 was idle. Next, STA 1 352 can sense the secondary 40 MHz channel 384 to check if it is idle as well. However, in one instance, STA 3 360 is transmitting a 20 MHz PPDU 398 during that same time period. Therefore, STA 1 352 can transmit a 40 MHz PPDU 366 during the second PPDU transmission.

In yet another example, STA 1 352 is again preparing for another PPDU transmission. The station, STA 1 352, senses an idle secondary channel 356 and an idle secondary 40 MHz channel 384. The availability of these secondary channels 356, 384 can allow STA 1 352 to transmit an 80 MHz PPDU 370. The transmission of the PPDUs can vary in bandwidth based upon the availability of bandwidth and the examples above are not meant to be restrictive. In addition, the contention windows 358a, 358b, 358c, 378, 396 can exist for one or more of the stations (i.e., STA 1 352, STA 2 354, STA 3 360) transmitting. In addition, the time intervals between, after, or before frames (i.e., DIFS 356a, 356b, 356c, 374,394 and PIFS 382, 386,390a, 390b) can vary in duration and time, as described above.

In many instances, available spectrum can go unused and system throughput can degrade to that of legacy standards as secondary channels appear busy during the pre-transmission sensing. To overcome system throughput degradation, a station, can for example, sense throughout its entire PPDU transmission for an idle secondary channel. If the station detects an idle secondary channel, it can take advantage of the bandwidth availability. The channel sensing of secondary channels during a packet transmission is possible by utilizing an echo cancellation technique.

The echo cancellation technique refers to an interference cancellation technique in which the station transmitting the PPDU cancels interference from its narrow bandwidth transmission to the secondary channels so that the channel status of the secondary channels can be measured during the narrow bandwidth transmission by the transmitting station.

Figure 4A:
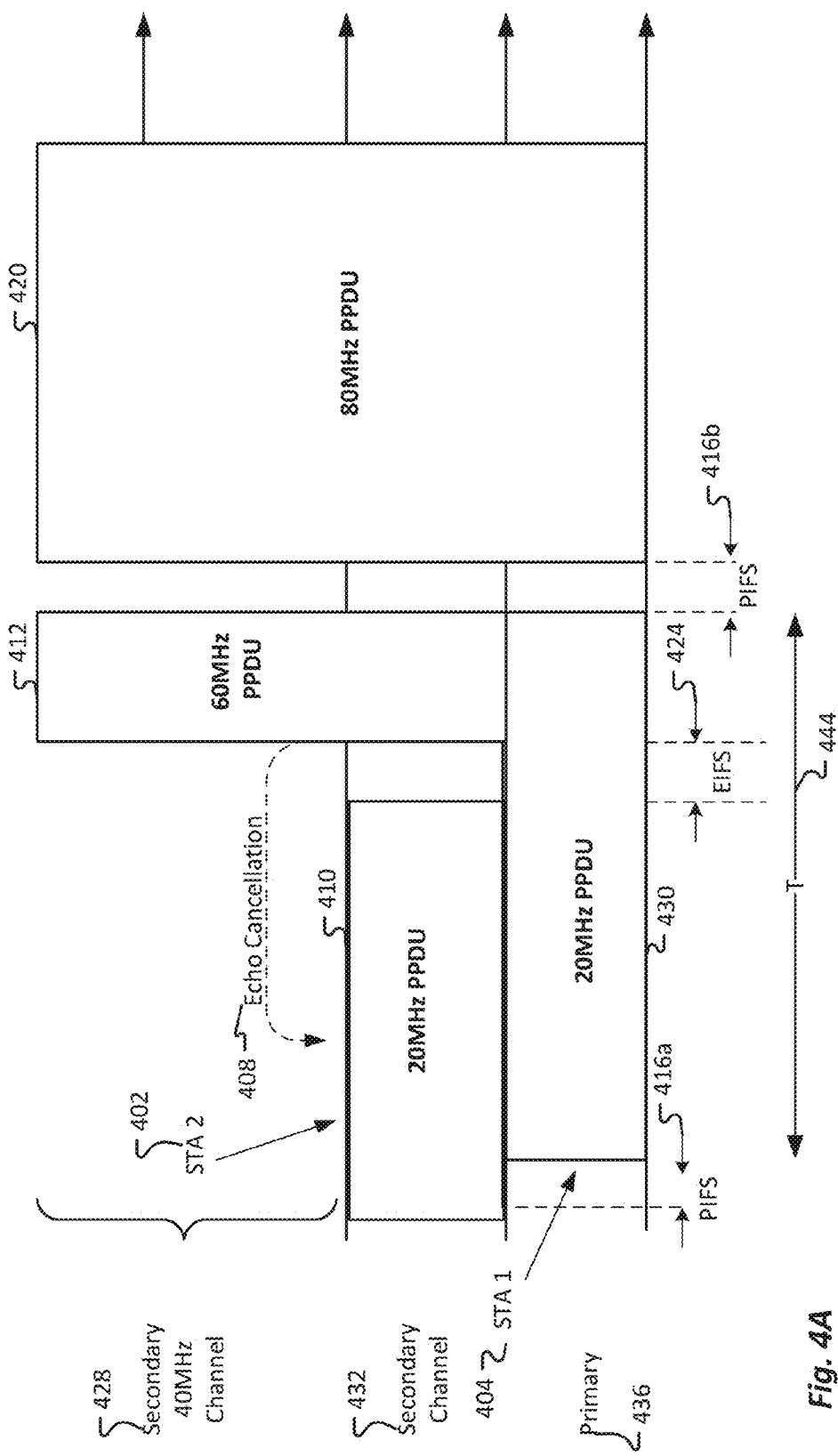
FIG. 4A illustrates an exemplary wide bandwidth PPDU transmission with echo cancellation.

FIG. 4A provides an exemplary wide bandwidth PPDU transmission with echo cancellation. In this embodiment, a station can adapt the station transmission bandwidth to take advantage of idle secondary channels upon becoming available. By using echo cancellation, a station is able to take advantage of a wide-bandwidth opportunity(ies) which in turn can increase the overall system throughput.

For example, in FIG. 4A, STA 1 404 is transmitting a 20 MHz PPDU 430. Prior to the 20 MHz PPDU 430, STA 1 404 senses for an idle secondary channel 432,428. Sensing can generally occur during the PIFS 416a time interval or any other time interval (i.e., SIFS, EIFS, AIFs, etc.). During this sensing period, STA 2 402 transmitting a 20 MHz PPDU 410 is located. Therefore, since the secondary channel 432, is busy, STA 1 404 can be restricted to a narrowband transmission of 20 MHz. To overcome this restriction and improve system performance, STA 1 404 can use echo cancellation 408 throughout its 20 MHz PPDU 430 transmission. Since, STA 1 404 knows the contents of the 20 MHz PPDU 430, STA 1 404 is able to cancel out its own transmission interference from the secondary channels and thus STA 1 404 can measure the status of the secondary channels during the 20 MHz PPDU 430 transmission. Therefore, a change in channel status notifies STA 1 404 that the secondary channel 432 is idle and available for transmission. Similarly, STA 1 404 can also apply this sensing technique and echo cancellation 408 to determine if the secondary 40 MHz channel 428 is also available.

As an example, STA 1 404 using the echo cancellation technique is able to sense idle secondary channels 432, 428 and can begin transmitting a wide bandwidth 60 MHz PPDU 412. In some instances, upon detection of an idle channel, a STA 1 404 can wait an EIFS 424 time interval, or any other time interval, to ensure that the previously transmitting frame has transmitted in its entirety. The transmission 60 MHz PPDU 412 can then occur over the time period remaining for the original transmission of the 20 MHz PPDU 430. That is to say, the 60 MHz PPDU 412 can transmit for the duration left in the STA 1 404 20 MHz PPDU 412 transmission T 444.

As another example, as STA 1 404 using the echo cancellation technique is able to locate idle secondary channels 432,428. Upon locating these idle secondary channels 432, 428, STA 1 404 can alternatively terminate the 20 MHz PPDU 430 transmission and take advantage of a wider bandwidth transmission of 80 MHz. Still as another example, in addition to the 20 MHz PPDU 430 transmission, the STA 1 404 can transmit an additional 20 MHz PPDU. Note that detection of an idle secondary channel provides STA 1 404 with an opportunity to continue transmitting the current PPDU in addition to a secondary PPDU at an equal or a larger bandwidth. In addition, STA 1 404, can terminate the PPDU transmission and begin retransmitting a new PPDU of equal or larger bandwidth than what was currently being transmitted for the original time duration T 444.

Yet as another example, an instance may exist where STA 1 404 during channel contention, a previous transmission using echo cancellation, and/or after completion of the previous transmission identifies both secondary channels 432 and 428 as being idle and is able to transmit an 80 MHz PPDU 420. Once again, detection of the idle channels can occur, prior to, during, or after some time interval (i.e., 416b, 424).

The use of wide-bandwidth transmission is advantageous as it can increase a system throughput and improve performance. The use of echo cancellation for wide-bandwidth transmission makes the use of secondary channels possible at the instant or shortly thereafter the secondary channel becomes idle. Transmitting on secondary channels is possible even after the initial channel contention for a medium has occurred, if the channel is available. For example, FIG. 4B illustrates a PPDU transmission that supports a higher system throughput as the station uses secondary channels.

Specifically, FIG. 4B, illustrates a second exemplary wide bandwidth PPDU transmission with echo cancellation.

Transmission over secondary channels for wide-bandwidth transmission is possible in instances where secondary channel(s) are idle and available for transmission. For example, FIG. 4B presents STA 1 454 that has identified secondary channel 436 as idle. STA 1 454, therefore is able to transmit a 40 MHz PPDU 470. In this scenario, the system is capable of adjusting its transmission bandwidth and can transition between available channels much like FIG. 4A above using echo cancellation. For example, STA 1 454 as just indicated, senses secondary channels to determine the bandwidth available for transmission.

In one instance, a 20 MHz PPDU 466 can be transmitting on the secondary 40 MHz channel 444, however secondary channel 450 is available. Therefore, STA 1 454 begins by transmitting the 40 MHz PPDU 470 while simultaneously echo cancelling 454 the interference generated by the 40 MHz PPDU 470 on secondary channels (i.e., secondary 40 MHz channel 444). As STA 2 440 completes transmission of the 20 MHz PPDU 466, the secondary 40 MHz channel 444 also becomes available for transmission. STA 1 454 having detected the idle secondary 40 MHz channel 444, utilizes the primary 456, the secondary 450, and the secondary 40 MHz 444 channels for a wide bandwidth transmission. STA 1 454 can use the idle channel (i.e., secondary 40 MHz channel 444) to transmit a 40 MHz PPDU 458 on the secondary 40 MHz channel 444 after an EIFS 478 time following the channel idle indication of the secondary 40 MHz channel 444. Note that the time following the channel idle indication can be none, a DIFS, AIFS, SIFS, etc., and/or any other time. The 40 MHz PPDU 458 transmission can end approximately at the same time as the 40 MHz PPDU 470 transmitted on the primary and secondary channels.

An alternate embodiment can include termination of the PPDU transmission on the one or more of the already in use channels (secondary channel 450 and primary channel 456) to transmit a PPDU at a wider bandwidth. For example, the 40 MHz PPDU 470 transmission can be terminated and an 80 MHz PDDU can be transmitted for the remaining time period T 486. Again, the transmission of this one or more wider bandwidth PPDUs can end approximately at the same time as the 40 MHz PPDU 470 transmitted on the primary 456 and secondary 450 channels.

Upon completion of the STAT 454 40 MHz PPDU 470 and 40 MHz PPDU 458, the STA 1 454 can transmit an 80 MHz PPDU if the secondary channels 450,444 remain idle after a PIFS 482 time following the end of the two 40 MHz PPDUs 470,458. Note that, transmission of the 80 MHz PPDU 462 can occur at any instance in time where the secondary 450 and secondary 40 MHz 444 channels are available.

The transmission PPDUs illustrated in FIGS. 3A-4B are for illustrative purposes only and can vary in time, duration, and location. Further, time intervals can exist before and/or after the PPDU transmission and can vary in time. Even further, the PPDUs can extend beyond an 80 MHz bandwidth to a 160 MHz bandwidth and beyond.

Figure 5:
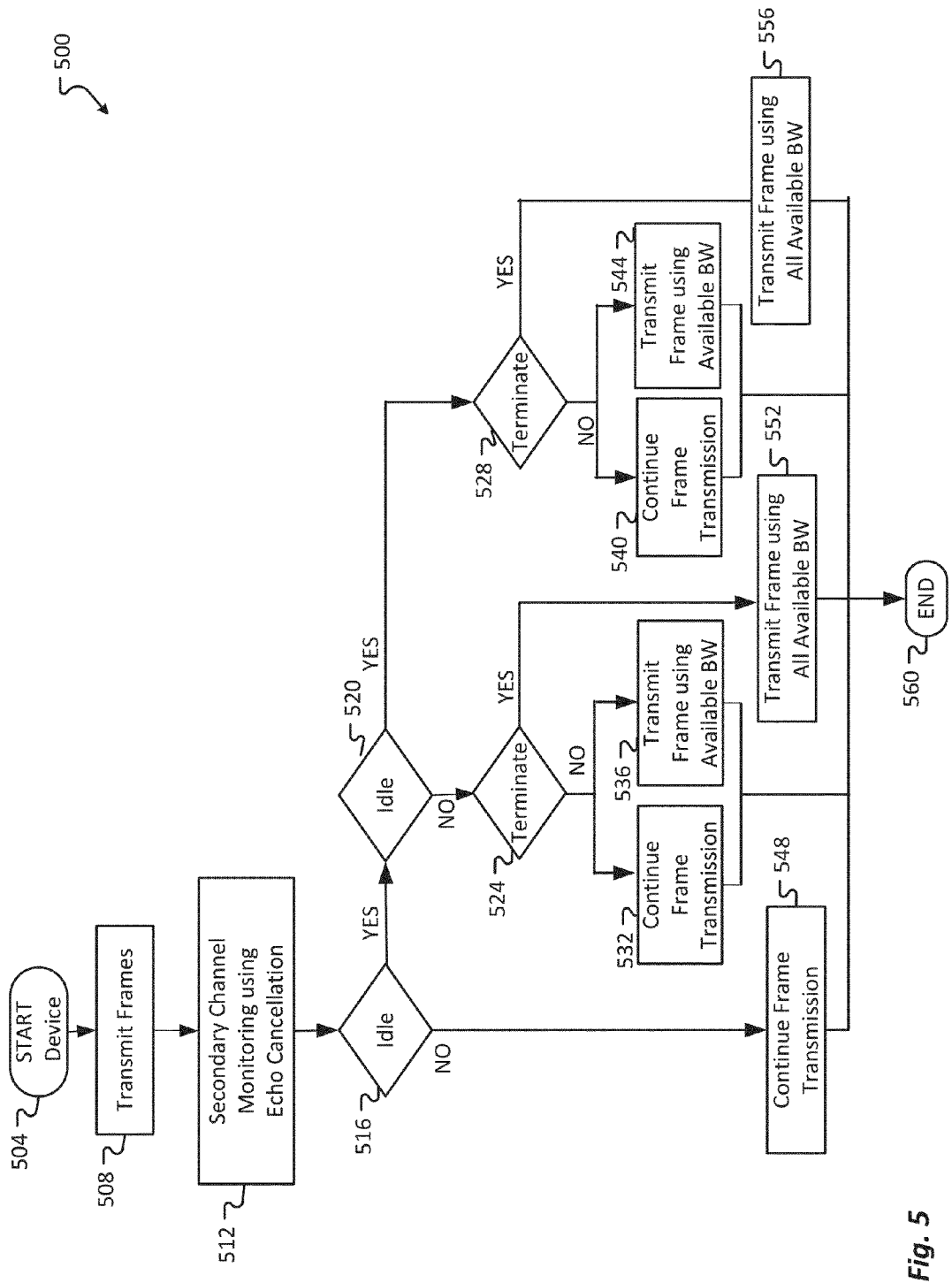
FIG. 5 is a flowchart illustrating frame transmission with echo cancellation.

FIG. 5 outlines a flowchart illustrating an exemplary frame transmission with echo cancellation technique. In particular, the process begins at step 504 and continues to step 508. At step 508, a station is actively transmitting frames or MPDUs at the currently available bandwidth. For example, a STA 1 can begin by transmitting a 20 MHz PPDU on an available primary channel. In this instance, STA 1 transmits a 20 MHz PPDU if a secondary channel is currently occupied by STA 2 transmitting on one or more of the secondary channels. In another example, STA 1 can transmit a 40 MHz PPDU if the primary and the first secondary channel are idle and available for transmission. Still in another example, STA 1 is able to transmit an 80 MHz PPDU when the primary, secondary, and secondary 40 MHz channels are available. Note that the transmission bandwidths and PPDU sizes can vary between 20 MHz and 160 MHz bandwidth and beyond. Increments in bandwidth availability can vary in time and size depending on current transmissions occurring on the medium. Variations in the channel, channel congestion, use, etc., are all variables that can play a role on current channel availability.

During transmission by STA 1 in step 508, secondary channels can be monitored at step 512. Monitoring of these channels can occur using echo cancellation. Echo cancellation is a technique that allows the transmitting station to cancel interference from its narrow bandwidth transmission to the secondary channels. If the interference is cancelled, then the transmitting station is able to obtain channel status of the secondary channels. Therefore, the echo cancellation technique allows a transmitter to continuously sense the busy/idle status of secondary channels during a packet transmission. By continuously monitoring/sensing secondary channels, a transmitter is able to immediately detect when the secondary channels become idle. Upon detection of an idle channel, the transmitter is then able to transmit at a wider bandwidth using the secondary channels that have become idle.

Therefore, during the secondary channel monitoring in step 512, if the transmitting station finds that the channel is not idle in step 516, then the station continues transmitting the current PPDU frame at its current bandwidth until the transmission is complete and the process ends at step 560. Alternatively, if during the sensing process, the transmitting station identifies an idle secondary channel in step 516, then the transmitting station continues to the following secondary channel (i.e., secondary 40 MHz channel), to determine if the following secondary channel is also available. Availability of the following secondary channel is checked in step 520.

At step 520 in the process, the transmitting station can determine that indeed the following/second secondary channel is not available and must now make a decision as to how to modify the transmitting station's current transmission based on the availability of the first secondary channel. The first determination is whether or not to terminate the current transmission in step 524. If the transmitting station determines to terminate the current transmission, then the transmitting station continues to step 552. At step 552, the initial frame transmission is terminated and instead a PPDU with all available bandwidth is transmitted for the duration of the initial frame transmission. Alternatively, if the transmitting station determines to keep the current transmission, then the station can do so in step 532 and simultaneously begin a second transmission in step 536. In 536, a new PPDU is generated and transmitted using the available bandwidth. Upon completion of the transmission of the two PPDUs from step 532, 526 and/or the larger PPDU from step 552, the process ends at step 560.

For example, a STA 1 can currently be transmitting a 20 MHz PPDU and midway through transmission using echo cancellation determine that a secondary 20 MHz bandwidth was idle. To take advantage of the newly discovered and available bandwidth, STA 1 can terminate the current 20 MHz PPDU transmission and instead transmit a larger 40 MHz PPDU. Alternatively, STA 1 can instead continue with the 20 MHz PPDU transmission and additionally transmit a second 20 MHz PPDU. Transmission of the new PPDUs continues for the time period originally allocated for the original 20 MHz PPDU.

Back at step 520, if the transmitting station determines that the following secondary channel is also available, then, the station can make use of the available bandwidth as the process continues to step 528. At step 528, the transmitting station determines how to best utilize the idle channels, by terminating the current transmission or continuing the current transmission and adding a secondary transmission. If the transmitting station determines to terminate at step 528, then the station continues to step 556, where the station terminates the current transmission and combines all available bandwidth in order to create a wide bandwidth transmission using all available bandwidth identified as idle. For example, STA 1 can be transmitting a narrowband PPDU of 20 MHz, STA 1 senses that a secondary channel (20 MHz) and a second secondary (40 MHz) channel are available. STA 1 determines that the station can terminate the 20 MHz narrowband transmission and instead transmit a large 80 MHz PPDU.

Alternatively, the station can determine that the station wants to continue with the current PPDU and in addition create and transmit a new PPDU frame using the available bandwidth. For this, the station continues the current transmission on step 540 and simultaneously transmits a new PPDU on step 544. An example of this scenario can include the STA 1 transmitting at 20 MHz and simultaneously transmitting a secondary PPDU at 60 MHz. Conclusion of PPDUs occurs at step 560, where the process ends.

Note that the examples mentioned above are only for illustrative purposes. The transmitting station can begin on a wide bandwidth transmission and still further increase the throughput through the identification of additional idle channels. In addition, the monitoring of secondary channels can exceed the two idle checks at step 516 and 520 for any one or more idle channels. Further details describing echo cancellation and the transmission of multiple PPDUs when channels become idle are explained in greater detail above and in conjunction with FIGS. 1-4.

An extension of this concept is to introduce a MAC protocol that can exchange necessary information between the transmitter and the receiver for a wider-bandwidth transmission in the middle of the narrow-bandwidth transmission (e.g., 20 MHz→80 MHz). For example, the receiver that was initially receiving a 20 MHz PPDU has to know if it will be receiving a wider channel bandwidth PPDU (e.g., 80 MHz PPDU) in the middle of the 20 MHz PPDU reception. The transmitter also needs to know if the receiver is ready to receive a wider channel bandwidth PPDU. In this case, the receiver may need to readjust its AGC for a wider bandwidth PPDU.

One exemplary embodiment proposes a new MAC protocol for the scheme that utilizes echo cancellation and/or quiet channel detection to enhance wide-bandwidth transmissions for OFDM based 802.11 stations.

One exemplary embodiment modifies the operation of the MAC/NAV circuitry 212 to initiate a new duplicate-RTS/CTS exchange in a wider channel bandwidth (e.g., 80 MHz or greater) in the middle of a narrow bandwidth PPDU transmission (e.g., the 20 MHz PPDU) when secondary channels become idle (as determined by one or more of the echo cancellation module 216 and/or the secondary channel(s) quiet detector 240) so that NAV information can be set for $3^{rd}$ party stations on the secondary channels.

Figure 6:
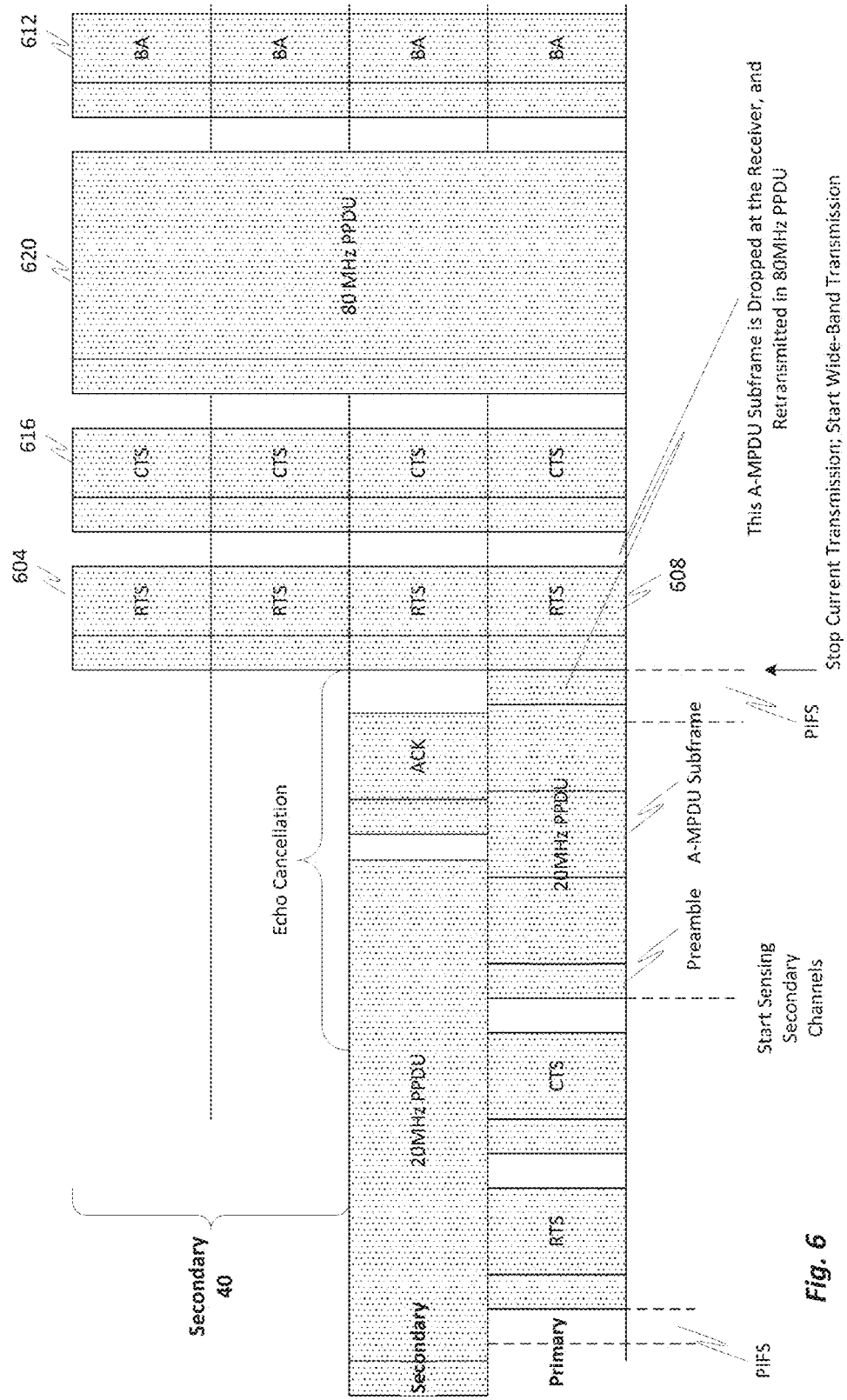
FIG. 6 illustrates an exemplary channel structure.

The initial data packet transmitted on the narrow channel bandwidth can be formatted as an A-MPDU (aggregated MPDU) so that the transmission can be interrupted in the middle of the transmission for the duplicate-RTS/CTS exchange without losing the entire packet transmission. For example, the wider-bandwidth channel transition does not affect the reception of A-MPDU subframes transmitted before the duplicate-RTS/CTS exchange, as shown in FIG. 6. The acknowledgements of the A-MPDU subframes are delayed after the wide-bandwidth PPDU transmission.

More specifically, FIG. 6 illustrates an example of when the secondary 20 MHz channel is busy, and then available (as determined by one or more of the echo cancellation module 216 and/or the secondary channel(s) quiet detector 240).

In this example, there is an overlapping BSS and the secondary channel is occupied by another station. The exemplary operation of the transmitter and receiver can be:

Behaviour of the Transmitter (STA 1):

STA 1 can follow the CCA rules defined in the 802.11 standard to access the medium. In the example shown in FIG. 6, STA 1 senses that the medium is busy in the secondary channel for the PIFS time and initiates a 20 MHz PPDU packet transmission by transmitting a RTS frame to its receiver (STA 2).

Upon receiving a CTS frame from STA 2, STA 1 transmits a 20 MHz PPDU packet in the A-MPDU format defined in the 802.11ac specification.

While transmitting the A-MPDU packet, STA 1 senses the secondary channels by utilizing the echo cancellation technique and/or the secondary channel quiet detector 240 using, for example, signal detection techniques. Alternatively, or in addition, signal detection could be used to determine the availability of the secondary channel(s), and if there is good isolation between the channels, STA 1 could determine if other channel(s) are open.

When the secondary and the secondary 40 channels become idle for a fixed duration of time (e.g., PIFS), STA 1 can stop the current A-MPDU transmission, and in cooperation with the MAC circuitry 212, transmit duplicate RTS frames across the available channel bandwidth. STA 1 may need a short transition time to switch to a wider-bandwidth transmission. In the example shown in FIG. 6, STA 1 is transmitting four duplicate RTS frames 604 on the 80 MHz channel. The RTS frames may set a new NAV for the wide-bandwidth PPDU transmission on the primary and the secondary channels.

The RTS frame on the primary channel 608 may include new information indicating that the current narrow-bandwidth packet transmission has ended for a new wide-bandwidth packet transmission. The information may be signalled with a reserved bit of the frame control field of the RTS frame. This information may be signalled with one of the following fields in the Frame Control field of the RTS frame set to 1: To DS, From DS, More Frag, Retry, More Data, Protected Frame, and Order fields (See FIG. 9). This information can also indicate that the A-MPDU subframes that were transmitted before the RTS frame transmission have to be acknowledged by BlockAck frames 612 following the wide-bandwidth packet transmission.

Upon receiving one or more CTS frames 616 on the channels that STA 1 transmitted the RTS frames on, STA 1 transmits a wide-bandwidth PPDU packet 620 based on the information indicated in the CTS frames 616 regarding the channel bandwidth available at STA 2. In the example in FIG. 6, STA 1 receives four CTS frames 616 in all four 20 MHz channels and the CTS frames indicate that the 80 MHz channel is available at the receiver side and then STA 1 transmits an 80 MHz PPDU 620 to STA2.

After transmitting the wide-bandwidth packet 620, STA 1 waits for BlockAck frames 612 over the transmitted channel.

Behaviour of the Receiver (STA 2):

The receiver can follow the rules defined in the 802.11 standard and responds with one or more CTS frames when it receives one or more RTS frames.

STA 2 receives the narrow-bandwidth packet (i.e., the 20 MHz A-MPDU packet in this example) and decodes A-MPDU subframes that are received correctly.

When STA 2 receives a new RTS frame in the middle of the A-MPDU reception with the information indicating that the transmitter is initiating a wide-bandwidth transmission, STA 2 prepares for a wide-bandwidth packet reception with STA 1. STA 2 knows the channel bandwidth STA 1 is using to transmit the RTS frames following the rules defined in the 802.11 standard (such as in the IEEE 802.11ac Specification) (i.e., signalled via the scrambling sequence).

STA 2 responds back with one or more CTS frames on the idle channels.

After receiving a wide-bandwidth PPDU from STA 1, STA 2 responds back with BlockAck frames including acknowledgement information of the narrow-bandwidth A-MPDU subframes that had been received before the reception of the new RTS frame.

Figure 7:
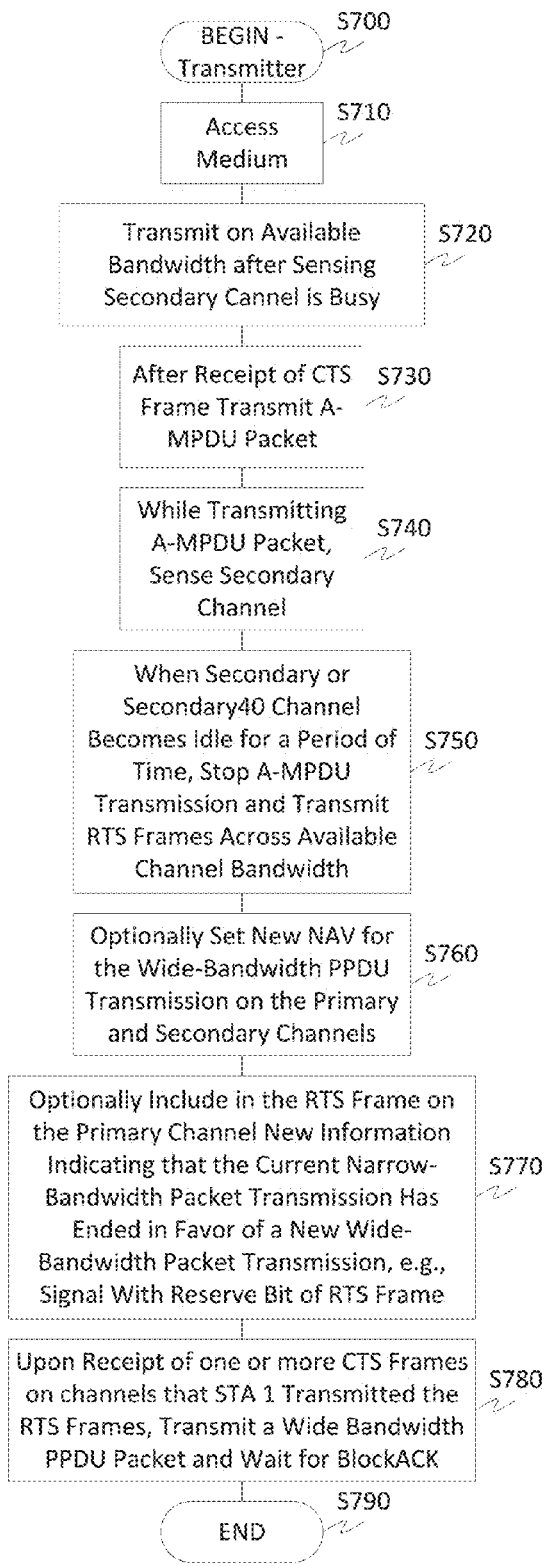
FIG. 7 is a flowchart illustrating exemplary transceiver operation.

FIG. 7 is a flowchart outlining an exemplary operation of a transmitter, such as STA 1. Control begins in step S700 and Continues to step S710.

In Step S710, STA 1 can follow the CCA rules defined in the 802.11 standard to access the medium. Specifically, STA 1 senses that the medium is busy in the secondary channel for the PIFS time and initiates a 20 MHz PPDU packet transmission by transmitting a RTS frame to its receiver (STA 2) (Step S720).

In Step S730, and upon receiving a CTS frame from STA 2, STA 1 transmits a 20 MHz PPDU packet in the A-MPDU format defined in the 802.11ac specification.

In Step S740, and while transmitting the A-MPDU packet, STA 1 senses the secondary channels by utilizing the echo cancellation technique. Alternatively, or in addition, signal detection could be used to determine the availability of the secondary channel(s), and if there is good isolation between the channels, STA 1 could determine if other channel(s) are open.

In step S750, and when the one or more of the secondary and the secondary 40 channels become idle for a fixed duration of time (e.g., PIFS), STA 1 can stop the current A-MPDU transmission and transmit duplicate RTS frames across the available channel bandwidth. STA 1 may need a short transition time to switch to a wider-bandwidth transmission. The RTS frames may optionally set a new NAV for the wide-bandwidth PPDU transmission on the primary and the secondary channels. (Step S760)

Next, in step S770, the RTS frame on the primary channel 608 may include new information indicating that the current narrow-bandwidth packet transmission has ended in favour of a new wide-bandwidth packet transmission. The information may be signalled with a reserved bit of the frame control field of the RTS frame. This information can also indicate that the A-MPDU subframes that were transmitted before the RTS frame transmission have to be acknowledged by BlockAck frames 612 following the wide-bandwidth packet transmission.

Then, in step S780, and upon receiving one or more CTS frames 616 on the channels that STA 1 transmitted the RTS frames on, STA 1 transmits a wide-bandwidth PPDU packet 620 based on the information indicated in the CTS frames 616 regarding the channel bandwidth available at STA 2. After transmitting the wide-bandwidth packet 620, STA 1 waits for BlockAck frames 612 over the transmitted channel.

Control then continues to step S790 where the control sequence ends.

Figure 8:
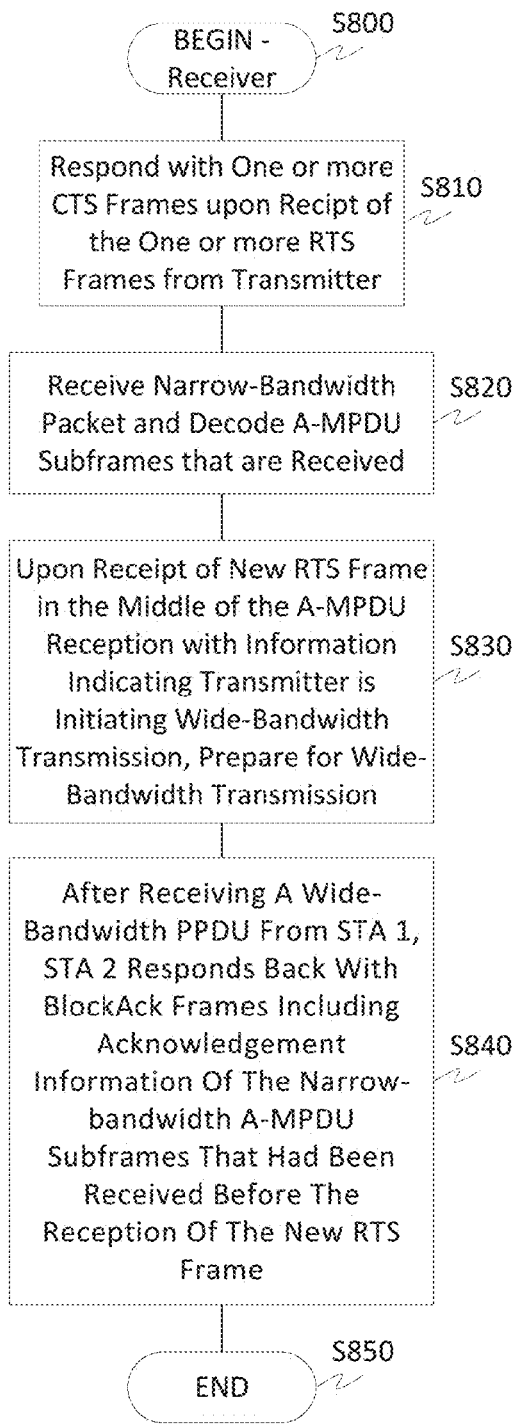
FIG. 8 is a flowchart illustrating exemplary transceiver operation.

FIG. 8 is a flowchart outlining an exemplary operation of a receiver, such as STA 2. Control begins in step S800 and Continues to step S810.

In Step S810, the receiver can follow the rules defined in the 802.11 standard and responds with one or more CTS frames when it receives one or more RTS frames from STA 1.

Next, in step S820, STA 2 receives the narrow-bandwidth packet (i.e., the 20 MHz A-MPDU packet in this example) and decodes A-MPDU subframes that are received correctly.

Then, in step S830, when STA 2 receives a new RTS frame in the middle of the A-MPDU reception with the information indicating that the transmitter is initiating a wide-bandwidth transmission, STA 2 prepares for a wide-bandwidth packet reception with STA 1. STA 2 knows the channel bandwidth STA 1 is using to transmit the RTS frames following the rules defined in the 802.11 standard (such as in the IEEE 802.11 ac Specification) (i.e., signalled via the scrambling sequence).

STA 2 responds back with one or more CTS frames on the idle channels.

IN step S840, and after receiving a wide-bandwidth PPDU from STA 1, STA 2 responds back with BlockAck frames including acknowledgement information of the narrow-bandwidth A-MPDU subframes that had been received before the reception of the new RTS frame.

Control then continues to step S850 where the control sequence ends.

Figure 9:
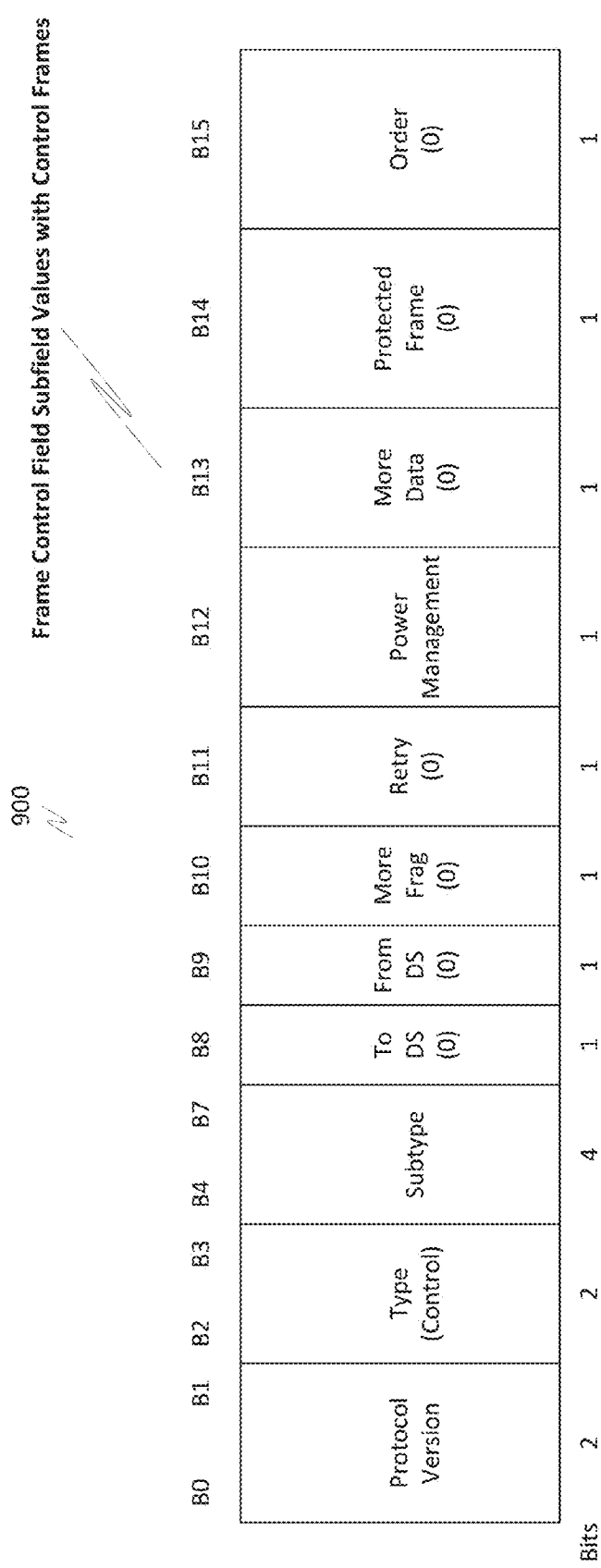
FIG. 9 illustrates an exemplary and optional frame control field for a control frame, such as RTS, usable with one or more of the techniques disclosed herein.

FIG. 9 illustrates an exemplary control frame that enables, for example, transmission from a narrow-bandwidth packet transmission to a wider-bandwidth packet transmission. As discussed, the RTS frame on the primary channel 608 may include new information indicating that the current narrow-bandwidth packet transmission has ended for a new wide-bandwidth packet transmission. The information may be signalled with a reserved bit of the frame control field of the RTS frame. This information may be signalled with one of the following optional fields in the Frame Control field 900 of, e.g., the RTS frame, set to 1: To DS, From DS, More Frag, Retry, More Data, Protected Frame, and Order fields (See FIG. 9). This information can also indicate that the A-MPDU subframes that were transmitted before the RTS frame transmission have to be acknowledged by BlockAck frames 612 following the wide-bandwidth packet transmission.

It should be appreciated, the various power management schemes discussed herein can have their specific features interchanged with one or more of the other power management schemes to provide, for example, further power savings, to alter/improve latency and/or alter platform functionality. While the techniques discussed herein have been specifically discussed in relation to IEEE 802.11 systems, it should be appreciated that the techniques discussed herein can generally be applicable to any type of wireless communication standard, protocol, and/or equipment. Moreover, all the flowcharts have been discussed in relation to a set of exemplary steps, it should be appreciated that some of these steps could be optional and excluded from the operational flow without affecting the success of the technique. Additionally, steps provided in the various flowcharts illustrated herein can be used in other flowcharts illustrated herein.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links (which may not be shown connecting the elements), including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuit, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to bandwidth utilization. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:

A wireless device, comprising:
one or more of an echo cancellation module and secondary channel quiet detector configured to determine whether one or more secondary channels are quiet; and
MAC/NAV circuitry configured to stop a transmission when one or more of the secondary channels are quiet for a period of time, and transmit a number of frames across available bandwidth on one or more of the secondary channels, wherein a narrow-bandwidth packet transmission has ended in favor of a wide-bandwidth packet transmission across one or more of the secondary channels.

Any one or more of the above aspects, further comprising one or more of a transmitter, a receiver, an analog front end, a security module, memory, one or more antennas, a processor and a network access unit.

Any one or more of the above aspects, further comprising a transmitter configured to access a medium and transmit on available bandwidth after determining that the one or more secondary channels are busy.

Any one or more of the above aspects, further comprising a transmitter configured to transmit RTS frames across an available channel bandwidth.

Any one or more of the above aspects, further comprising a transmitted adapted to transmit an RTS frame on a primary channel with information indicating that the narrow-bandwidth packet transmission has ended in favor of the wide-bandwidth packet transmission.

Any one or more of the above aspects, further comprising a receiver configured to receive one or more CTS frames; and
a transmitter configured to transmit a wide-bandwidth packet.

Any one or more of the above aspects, wherein the device is further configured to wait for a block acknowledgement.

Any one or more of the above aspects, wherein CTS frames are received on channels where a transmitter transmitted RTS frames.

Any one or more of the above aspects, wherein the wide-bandwidth packet is an A-MPDU packet.

Any one or more of the above aspects, further comprising a receiver configured to, upon receipt of an RTS frame in a middle of an A-MPDU reception containing information indicating a transmitter is initiating the wide-bandwidth transmission, prepare for wide-bandwidth transmission.

A method of operating a wireless device, comprising:
determining whether one or more secondary channels are quiet;
stopping a transmission when one or more of the secondary channels are quiet for a period of time; and
transmitting a number of frames across available bandwidth on one or more of the secondary channels, wherein a narrow-bandwidth packet transmission has ended in favor of a wide-bandwidth packet transmission across one or more of the secondary channels.

Any one or more of the above aspects, wherein the wireless device comprises one or more of a transmitter, a receiver, an echo cancellation device, a secondary channel quiet detector, an analog front end, a security module, memory, one or more antennas, a processor and a network access unit.

Any one or more of the above aspects, further comprising accessing a medium and transmitting on available bandwidth after determining that the one or more secondary channels are busy.

Any one or more of the above aspects, further comprising transmitting an RTS frames across an available channel bandwidth.

Any one or more of the above aspects, further comprising transmitting an RTS frame on a primary channel with information indicating that the narrow-bandwidth packet transmission has ended in favor of the wide-bandwidth packet transmission.

Any one or more of the above aspects, further comprising:
receiving one or more CTS frames; and
transmitting a wide-bandwidth packet.

Any one or more of the above aspects, further comprising waiting for a block acknowledgement.

Any one or more of the above aspects, wherein CTS frames are received on channels where a transmitter transmitted RTS frames.

Any one or more of the above aspects, wherein the wide-bandwidth packet is an A-MPDU packet.

Any one or more of the above aspects, further comprising, upon receipt of an RTS frame in a middle of an A-MPDU reception containing information indicating a transmitter is initiating the wide-bandwidth transmission, preparing for wide-bandwidth transmission.

A wireless device, comprising:
upon receipt of an RTS frame in a middle of an A-MPDU reception containing information indicating a transmitter is initiating the wide-bandwidth transmission, prepare for wide-bandwidth reception.

Any one or more of the above aspects, wherein the receiver is further configured to respond with one or more CTS frames after receipt of one or more RTS frames.

Any one or more of the above aspects, wherein the receiver is further configured to receive a narrow-bandwidth packet.

Any one or more of the above aspects, wherein the receiver is further configured to decode A-MPDU subframes.

Any one or more of the above aspects, wherein the receiver is further configured to, after receipt of a wide-bandwidth transmission, respond with a block acknowledgement.

Any one or more of the above aspects, wherein the receiver is further configured to receive one or more new RTS frames.

Any one or more of the above aspects, wherein the new RTS frames are on one or more secondary channels.

Any one or more of the above aspects, further comprising one or more of a transmitter, an analog front end, a security module, memory, one or more antennas, a processor and a network access unit.

A method of operating a wireless device, comprising:
upon receipt of an RTS frame by a receiver in a middle of an A-MPDU reception containing information indicating a transmitter is initiating the wide-bandwidth transmission, preparing for wide-bandwidth reception.

Any one or more of the above aspects, wherein the receiver further responds with one or more CTS frames after receipt of one or more RTS frames.

Any one or more of the above aspects, wherein the receiver further receives a narrow-bandwidth packet.

Any one or more of the above aspects, wherein the receiver further decodes A-MPDU subframes.

Any one or more of the above aspects, wherein the receiver further, after receipt of a wide-bandwidth transmission, responds with a block acknowledgement.

Any one or more of the above aspects, wherein the receiver further receives one or more new RTS frames.

Any one or more of the above aspects, wherein the new RTS frames are on one or more secondary channels.

Any one or more of the above aspects, wherein the wireless device comprises one or more of a transmitter, an analog front end, a security module, memory, one or more antennas, a processor and a network access unit.

A wireless device, comprising:
means for determining whether one or more secondary channels are quiet;
means for stopping a transmission when one or more of the secondary channels are quiet for a period of time; and means for transmitting a number of frames across available bandwidth on one or more of the secondary channels, wherein a narrow-bandwidth packet transmission has ended in favor of a wide-bandwidth packet transmission across one or more of the secondary channels.

Any one or more of the above aspects, wherein the wireless device comprises one or more of a transmitter, a receiver, an echo cancellation device, a secondary channel quiet detector, an analog front end, a security module, memory, one or more antennas, a processor and a network access unit.

Any one or more of the above aspects, further comprising means for accessing a medium and transmitting on available bandwidth after determining that the one or more secondary channels are busy.

Any one or more of the above aspects, further comprising means for transmitting an RTS frames across an available channel bandwidth.

Any one or more of the above aspects, further comprising means for transmitting an RTS frame on a primary channel with information indicating that the narrow-bandwidth packet transmission has ended in favor of the wide-bandwidth packet transmission.

Any one or more of the above aspects, further comprising:
means for receiving one or more CTS frames; and
means for transmitting a wide-bandwidth packet.

Any one or more of the above aspects, further comprising means for waiting for a block acknowledgement.

Any one or more of the above aspects, wherein CTS frames are received on channels where a transmitter transmitted RTS frames.

Any one or more of the above aspects, wherein the wide-bandwidth packet is an A-MPDU packet.

Any one or more of the above aspects, further comprising, upon receipt of an RTS frame in a middle of an A-MPDU reception containing information indicating a transmitter is initiating the wide-bandwidth transmission, means for preparing for wide-bandwidth transmission.

A wireless device, comprising:
means for receiving an RTS frame; and
upon receipt of the RTS frame in a middle of an A-MPDU reception containing information indicating a transmitter is initiating the wide-bandwidth transmission, means for preparing for wide-bandwidth reception.

Any one or more of the above aspects, further comprising means for responding with one or more CTS frames after receipt of one or more RTS frames.

Any one or more of the above aspects, further comprising means for receiving a narrow-bandwidth packet.

Any one or more of the above aspects, further comprising means for decoding A-MPDU subframes.

Any one or more of the above aspects, further comprising means for, after receipt of a wide-bandwidth transmission, responding with a block acknowledgement.

Any one or more of the above aspects, further comprising means for receiving one or more new RTS frames.

Any one or more of the above aspects, wherein the new RTS frames are on one or more secondary channels.

Any one or more of the above aspects, wherein the wireless device comprises one or more of a transmitter, an analog front end, a security module, memory, one or more antennas, a processor and a network access unit.

A non-transitory computer-readable information storage media, having stored thereon instructions, that when executed by a processor, perform a method for operating a wireless device, comprising:

determining whether one or more secondary channels are quiet;

stopping a transmission when one or more of the secondary channels are quiet for a period of time; and transmitting a number of frames across available bandwidth on one or more of the secondary channels, wherein a narrow-bandwidth packet transmission has ended in favor of a wide-bandwidth packet transmission across one or more of the secondary channels.

Any one or more of the above aspects, wherein the wireless device comprises one or more of a transmitter, a receiver, an echo cancellation device, a secondary channel quiet detector, an analog front end, a security module, memory, one or more antennas, a processor and a network access unit.

Any one or more of the above aspects, further comprising accessing a medium and transmitting on available bandwidth after determining that the one or more secondary channels are busy.

Any one or more of the above aspects, further comprising transmitting an RTS frames across an available channel bandwidth.

Any one or more of the above aspects, further comprising transmitting an RTS frame on a primary channel with information indicating that the narrow-bandwidth packet transmission has ended in favor of the wide-bandwidth packet transmission.

Any one or more of the above aspects, further comprising:
receiving one or more CTS frames; and
transmitting a wide-bandwidth packet.

Any one or more of the above aspects, further comprising waiting for a block acknowledgement.

Any one or more of the above aspects, wherein CTS frames are received on channels where a transmitter transmitted RTS frames.

Any one or more of the above aspects, wherein the wide-bandwidth packet is an A-MPDU packet.

Any one or more of the above aspects, further comprising, upon receipt of an RTS frame in a middle of an A-MPDU reception containing information indicating a transmitter is initiating the wide-bandwidth transmission, preparing for wide-bandwidth transmission.

A non-transitory computer-readable information storage media, having stored thereon instructions, that when executed by a processor, perform a method for operating a wireless device, comprising:

upon receipt of an RTS frame by a receiver in a middle of an A-MPDU reception containing information indicating a transmitter is initiating the wide-bandwidth transmission, preparing for wide-bandwidth reception.

Any one or more of the above aspects, wherein the receiver further responds with one or more CTS frames after receipt of one or more RTS frames.

Any one or more of the above aspects, wherein the receiver further receives a narrow-bandwidth packet.

Any one or more of the above aspects, wherein the receiver further decodes A-MPDU subframes.

Any one or more of the above aspects, wherein the receiver further, after receipt of a wide-bandwidth transmission, responds with a block acknowledgement.

Any one or more of the above aspects, wherein the receiver further receives one or more new RTS frames.

Any one or more of the above aspects, wherein the new RTS frames are on one or more secondary channels.

Any one or more of the above aspects, wherein the wireless device comprises one or more of a transmitter, an analog front end, a security module, memory, one or more antennas, a processor and a network access unit.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

It is therefore apparent that there has at least been provided systems and methods for bandwidth management in a wireless device. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A wireless device, comprising:
one or more of an echo cancellation module and connected memory, and a secondary channel quiet detector, that monitors one or more secondary channels, configured to determine whether the one or more secondary channels are quiet;
MAC/NAV circuitry configured to stop a current A-MPDU (aggregated MAC Protocol Data Unit) transmission on a primary channel when one or more of the secondary channels are determined to be quiet for a period of time; and
a transmitter that transmits a number of frames across available bandwidth on one or more of the secondary channels, wherein a narrower-bandwidth packet transmission has ended in favor of a wider-bandwidth packet transmission across one or more of the secondary channels, and a frame control field of an RTS (Request to Send) frame indicates that the narrower-bandwidth packet transmission has ended in favor of the wider-bandwidth packet transmission.

2. The device of claim 1, further comprising one or more of a transmitter, a receiver, an analog front end, a security module, memory, one or more antennas, a processor and a network access unit.

3. The device of claim 1, wherein the transmitter is further configured to access a medium and transmit on available bandwidth after determining that the one or more secondary channels are busy.

4. The device of claim 1, wherein the transmitter is further configured to transmit RTS frames across an available channel bandwidth.

5. The device of claim 1, wherein the transmitter is further adapted to transmit an RTS frame on a primary channel with information indicating that the narrower-bandwidth packet transmission has ended in favor of the wider-bandwidth packet transmission.

6. The device of claim 1, further comprising a receiver configured to receive one or more CTS frames; and
the transmitter further configured to transmit a wider-bandwidth packet.

7. The device of claim 1, wherein the device is further configured to wait for a block acknowledgement.

8. The device of claim 1, wherein CTS frames are received on channels where a transmitter transmitted RTS frames.

9. The device of claim 1, wherein the wider-bandwidth packet is an A-MPDU packet.

10. The device of claim 1, further comprising a receiver configured to, upon receipt of an RTS frame in a middle of an A-MPDU reception containing information indicating a transmitter is initiating the wide-bandwidth transmission, prepare for wide-bandwidth transmission and/or the information can also indicate that A-MPDU subframes that were transmitted before the RTS frame transmission have to be acknowledged by BlockAck frames following the wider-bandwidth packet transmission.

11. A method of operating a wireless device, comprising:
   determining whether one or more secondary channels are quiet;
   stopping a current A-MPDU (aggregated MAC Protocol Data Unit) transmission on a primary channel when one or more of the secondary channels are determined to be quiet for a period of time; and
   transmitting a number of frames across available bandwidth on one or more of the secondary channels, wherein a narrower-bandwidth packet transmission has ended in favor of a wider-bandwidth packet transmission across one or more of the secondary channels, and a frame control field of an RTS (Request to Send) frame indicates that the narrower-bandwidth packet transmission has ended in favor of the wider-bandwidth packet transmission.

12. The method of claim 11, wherein the wireless device comprises one or more of a transmitter, a receiver, an echo cancellation device, a secondary channel quiet detector, an analog front end, a security module, memory, one or more antennas, a processor and a network access unit.

13. The method of claim 11, further comprising accessing a medium and transmitting on available bandwidth after determining that the one or more secondary channels are busy.

14. The method of claim 11, further comprising transmitting an RTS frames across an available channel bandwidth.

15. The method of claim 11, further comprising transmitting an RTS frame on a primary channel with information indicating that the narrower-band width packet transmission has ended in favor of the wider-bandwidth packet transmission.

16. The method of claim 11, further comprising one or more of:
   receiving one or more CTS frames;
   transmitting a wider-bandwidth packet;
   waiting for a block acknowledgement;
   upon receipt of an RTS frame in a middle of an A-MPDU reception containing information indicating a transmitter is initiating the wide-bandwidth transmission, preparing for wide-bandwidth transmission; and/or
   the information can also indicate that A-MPDU subframes that were transmitted before the RTS frame transmission have to be acknowledged by BlockAck frames following the wider-bandwidth packet transmission.

17. The method of claim 11, wherein CTS frames are received on channels where a transmitter transmitted RTS frames.

18. The method of claim 11, wherein the wide-bandwidth packet is an A-MPDU packet.

19. A computer-readable non-transitory storage medium that contains instructions, which when executed by one or more processors result in performing operations comprising:
   determining whether one or more secondary channels are quiet;
   stopping a current A-MPDU (aggregated MAC Protocol Data Unit) transmission on a primary channel when one or more of the secondary channels are determined to be quiet for a period of time; and
   transmitting a number of frames across available bandwidth on one or more of the secondary channels, wherein a narrower-bandwidth packet transmission has ended in favor of a wider-bandwidth packet transmission across one or more of the secondary channels, and a frame control field of an RTS (Request to Send) frame indicates that the narrower-bandwidth packet transmission has ended in favor of the wider-bandwidth packet transmission.

20. The medium of claim 19, wherein the wireless device comprises one or more of a transmitter, a receiver, an echo cancellation device, a secondary channel quiet detector, an analog front end, a security module, memory, one or more antennas, a processor and a network access unit.

21. The medium of claim 19, further comprising the operation of accessing a medium and transmitting on available bandwidth after determining that the one or more secondary channels are busy.

22. The medium of claim 19, further comprising the operation of transmitting an RTS frames across an available channel bandwidth.

23. The medium of claim 19, further comprising transmitting an RTS frame on a primary channel with information indicating that the narrower-bandwidth packet transmission has ended in favor of the wider-bandwidth packet transmission.

24. The medium of claim 19, further comprising one or more of the operations of:
   receiving one or more CTS frames;
   transmitting a wide-bandwidth packet;
   waiting for a block acknowledgement;
   upon receipt of an RTS frame in a middle of an A-MPDU reception containing information indicating a transmitter is initiating the wide-bandwidth transmission, preparing for wide-bandwidth transmission, and/or
   the information can also indicate that A-MPDU subframes that were transmitted before the RTS frame transmission have to be acknowledged by BlockAck frames following the wider-bandwidth packet transmission.

25. The medium of claim 19, wherein
   CTS frames are received on channels where a transmitter transmitted RTS frames; and the wider-bandwidth packet is an A-MPDU packet.

* * * * *

UNITED STATES PATENT AND TRADEMARK OFFICE
CERTIFICATE OF CORRECTION

PATENT NO. : 9,749,110 B2
APPLICATION NO. : 14/860977
DATED : August 29, 2017
INVENTOR(S) : Minyoung Park et al.

It is certified that error appears in the above-identified patent and that said Letters Patent is hereby corrected as shown below:

In the Claims

• At Column 27, Claim 15, Line 36, delete "narrower-band width" and insert -- narrower-bandwidth --, therefore.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*